(12) United States Patent
Pero

(10) Patent No.: US 12,540,811 B2
(45) Date of Patent: Feb. 3, 2026

(54) COMPACT THERMAL EXPANSION COMPENSATOR

(71) Applicant: Michael J. Pero, King George, VA (US)

(72) Inventor: Michael J. Pero, King George, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 288 days.

(21) Appl. No.: 18/377,235

(22) Filed: Oct. 5, 2023

(65) Prior Publication Data

US 2024/0151511 A1   May 9, 2024

Related U.S. Application Data

(60) Provisional application No. 63/423,261, filed on Nov. 7, 2022.

(51) Int. Cl.
    *G01B 9/02*      (2022.01)
(52) U.S. Cl.
    CPC .............. *G01B 9/02049* (2013.01)
(58) Field of Classification Search
    CPC .............. G02B 7/00–40; G01B 9/02049
    USPC .............. 359/694–706, 811–830
    See application file for complete search history.

(56) References Cited

U.S. PATENT DOCUMENTS

| | | | | |
|---|---|---|---|---|
| 5,210,650 A * | 5/1993 | O'Brien | ............... | G02B 7/008 385/33 |
| 5,523,893 A * | 6/1996 | Haas | ............... | G02B 7/028 359/818 |
| 6,650,412 B1 * | 11/2003 | Slater | ............... | G01J 3/0286 356/328 |
| 6,865,034 B1 * | 3/2005 | Willis | ............... | G02B 7/028 372/33 |
| 8,441,747 B2 * | 5/2013 | Heintel | ............... | G02B 13/143 359/830 |
| 2005/0237640 A1 * | 10/2005 | Cipra | ............... | G02B 7/00 372/99 |
| 2011/0096314 A1 * | 4/2011 | Sato | ............... | G03F 7/70825 355/77 |

FOREIGN PATENT DOCUMENTS

EP        1026532 A1 *  8/2000   ............ G02B 7/026

* cited by examiner

*Primary Examiner* — Jessica M Merlin
(74) *Attorney, Agent, or Firm* — Gerhard W. Thielman

(57) ABSTRACT

A compact modular mount is provided for mechanically compensating for focal distance change on a table due to thermal expansion. The mount includes first and second rings, a plurality of spacers and a plurality of bolts. The second material has a multi-factor higher coefficient of thermal expansion than the first material. Each of the first and second rings has a plurality of holes for receiving the bolts. The spacers each include symmetrically arranged plates hinging to adjacent segments. The bolts maintain angular alignment of the rings.

18 Claims, 6 Drawing Sheets

900

| Temperature: 45°C<br>Compression: 18.32# 910 | Temperature: 4°C<br>Compression: 18.32# 940 | Temperature: -20°C<br>Compression: 18.32# 970 |
|---|---|---|
| Micrometer 1: 0.306"<br>Micrometer 2: 0.301"<br>Micrometer 3: 0.296"<br>Micrometer 4: 0.299" | Micrometer 1: 0.311"<br>Micrometer 2: 0.308"<br>Micrometer 3: 0.302"<br>Micrometer 4: 0.307" | Micrometer 1: 0.314"<br>Micrometer 2: 0.311"<br>Micrometer 3: 0.306"<br>Micrometer 4: 0.310" |
| Temperature: 72°C<br>Compression: 0# 920 | Temperature: 4°C<br>Compression: 0# 950 | Temperature: -28°C<br>Compression: 0# 980 |
| Micrometer 1: 0.298"<br>Micrometer 2: 0.299"<br>Micrometer 3: 0.284"<br>Micrometer 4: 0.290" | Micrometer 1: 0.310"<br>Micrometer 2: 0.306"<br>Micrometer 3: 0.300"<br>Micrometer 4: 0.304" | Micrometer 1: 0.314"<br>Micrometer 2: 0.311"<br>Micrometer 3: 0.306"<br>Micrometer 4: 0.31" |
| Temperature: 77°C<br>Compression: 18.32# 930 | Temperature: -22°C<br>Compression: 18.32# 960 | Temperature: -26°C<br>Compression: 18.32# 990 |
| Micrometer 1: 0.306"<br>Micrometer 2: 0.301"<br>Micrometer 3: 0.288"<br>Micrometer 4: 0.298" | Micrometer 1: 0.319"<br>Micrometer 2: 0.316"<br>Micrometer 3: 0.309"<br>Micrometer 4: 0.314" | Micrometer 1: 0.3205"<br>Micrometer 2: 0.317"<br>Micrometer 3: 0.312"<br>Micrometer 4: 0.315" |

FIG. 9

Mechanical Parameter Inputs 1010

| | Growth Length (in) | CTE |
|---|---|---|
| Triangle Expander Base 1 (Virtual_TI): | 1.625 | 8.50E-06 |
| Triangle Expander Base 2 (Normal Exp Length): | 0.2 | |

Mechanical Parameter Calculations 1020

| | Growth Length (in) | CTE |
|---|---|---|
| Triangle Expander Hyp Length: | 1.637261433 | 2.20E-05 |

Calculations 1030

| Base 1 New Length: | 1.625387 |
|---|---|
| Hyp New Length: | 1.63827 |

Main Result 1040

| New Normal Length: | 0.205052 |
|---|---|
| Normal Length Difference: | 0.005052 |

Thermal Condition 1050

| Ambient Temperature: | 50 | C |
|---|---|---|

FIG. 10

COMPACT THERMAL EXPANSION COMPENSATOR

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to mounting devices that compensate for positional changes in temperature. In particular, the invention relates to devices that counteract thermal expansion for laser instrument platforms. As components receive ambient thermal and laser energy, heat absorption induces thermal expansion, which introduces stresses and distortions.

SUMMARY

Conventional mirror mounts for laser test platforms yield disadvantages addressed by various exemplary embodiments of the present invention. In particular, various exemplary embodiments provide a compact modular mount for mechanically compensating focal distance change on a table due to thermal expansion.

The mount includes first and second rings, a plurality of spacers and a plurality of bolts. The second material has a multi-factor higher coefficient of thermal expansion than the first material. Each of the first and second rings has a plurality of holes for receiving the bolts. The spacers each include symmetrically arranged plates hinging to adjacent segments. The bolts maintain angular alignment of the rings.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 9 is a tabular view of distance measurements from prototype test data; and

FIG. 10 is a tabular view of material properties and calculated physical responses.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The disclosure generally employs quantity units with the following abbreviations: length in meters (m) or inches ("), mass in grams (g) or pounds-mass ($lb_m$), time in seconds (s), angles in degrees (°), force in newtons (N) or pounds-force ($lb_f$), and temperature in kelvins (K) or degrees Celsius (° C.). Supplemental measures can be derived from these, such as density in grams-per-cubic-centimeters (g/cm$^3$), moment of inertia in gram-square-centimeters (kg-m$^2$) and the like.

Figure 1A:
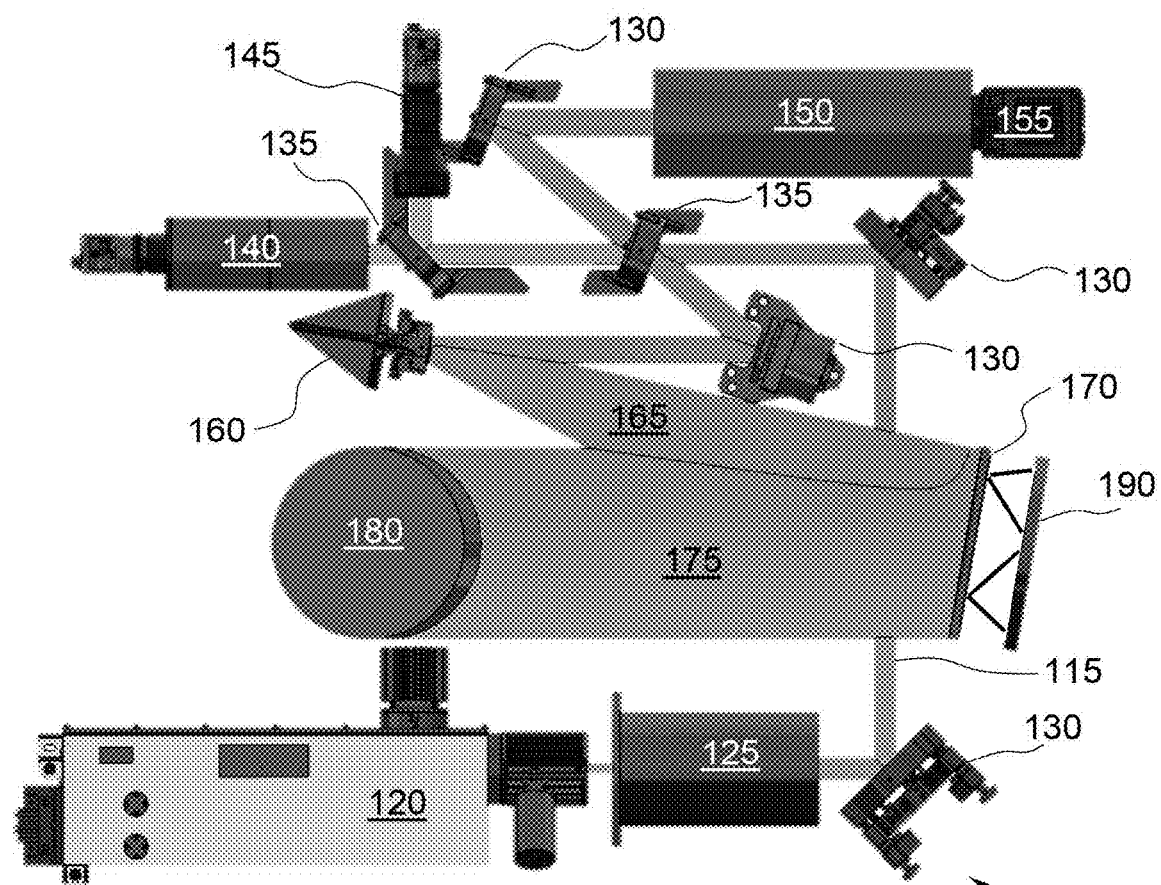
FIGS. 1A and 1B are respective plan and perspective views of a laser test setup.
Figure 1B:
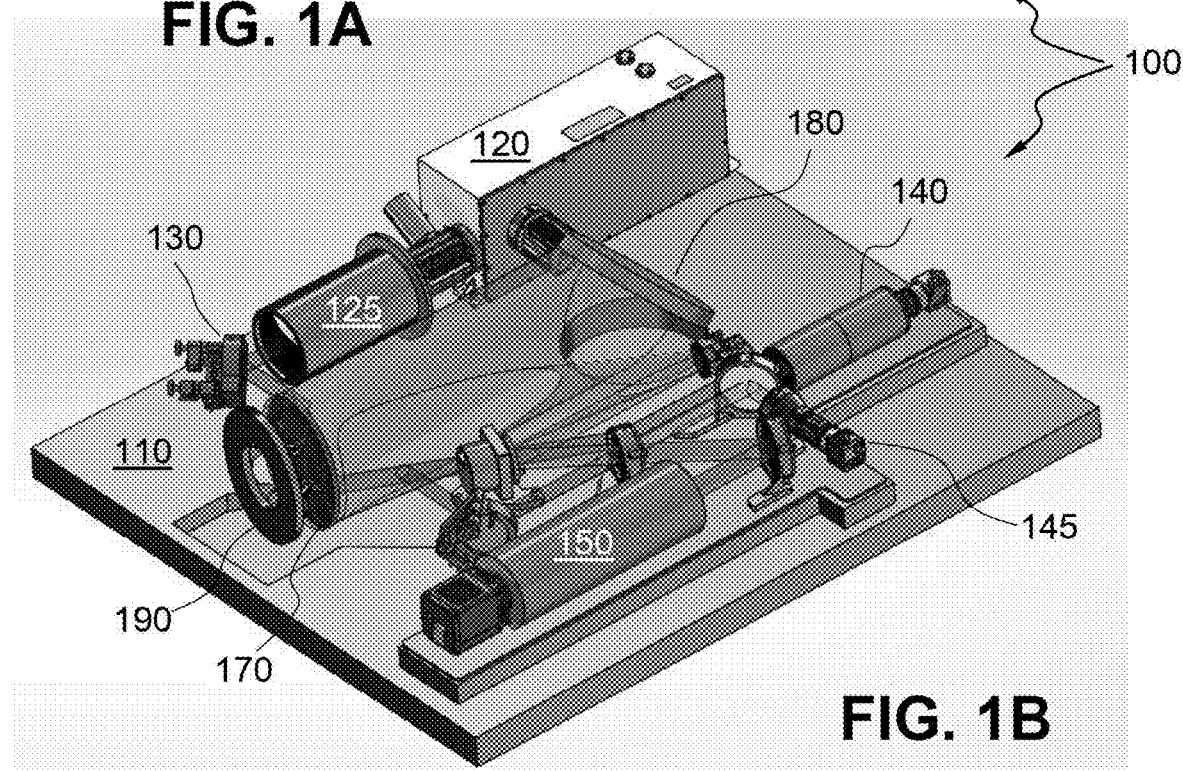

FIGS. 1A and 1B show respective plan and perspective views 100 of laser alignment system mounted to a table bench 110 for producing a coherent light beam 115 emitted via a laser 120. The bench 110 measures approximately 40" by 35" and for test purposes is composed of titanium. The beam 115 passes through an initial beam expander 125 and then deflects by mirrors 130 until reaching a beam splitter 135, which divides the beam 115 towards second beam splitter 135 to a spatial sensor 140 and a tilt sensor 145. A mirror 130 redirects one divided beam towards the secondary OAP mirror 160, reflecting a diverged beam 165.

The diverged beam 165 then reflects off the primary OAP mirror 170 into an expanded parallel beam 175 towards a canted fold mirror 180. The OAP mirror 170 attaches to an exemplary thermal compensation mount 190 (as depicted by proxy). Auxiliary equipment mounted to the table 110 include short wavelength infrared (SWIR) focusing system 150, SWIR camera 155, tilt sensor 140 and spatial sensor 145 that receive the other divided beam 115.

Figure 2:
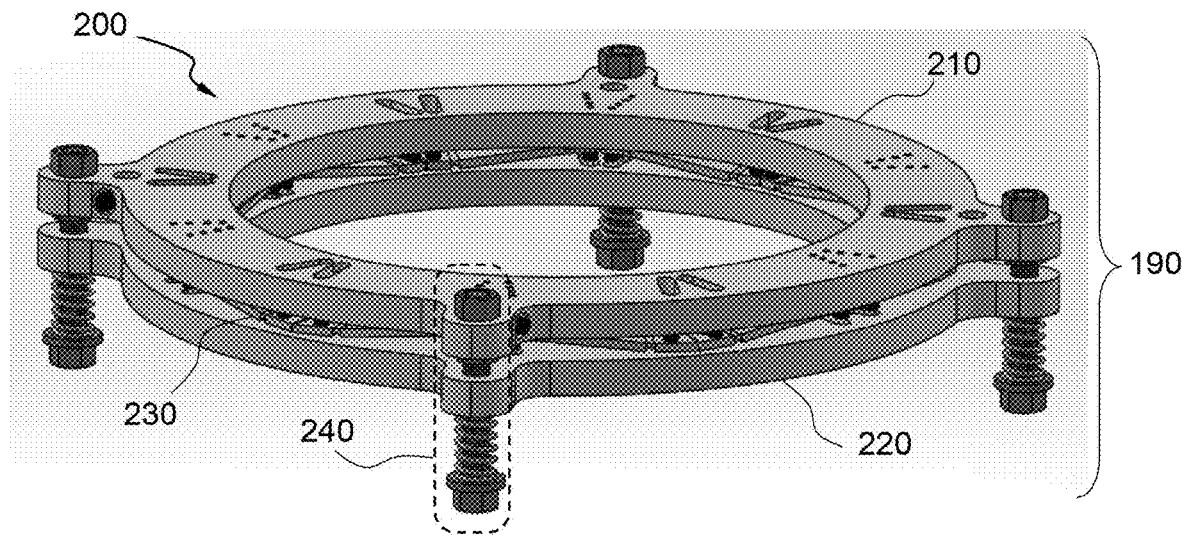
FIG. 2 is a perspective assembly view of an exemplary compact thermal expander.

FIG. 2 shows a perspective assembly view 200 of the exemplary bimetallic compact thermal compensating mount 190. Proximal (upper) and distal (lower) annular ring flanges 210 and 220 are separated by a cruciform set of four interlocking spacers that form expansion webs 230 and connected by four adjacent spring supported bolt assemblies 240. The flanges 210 and 220 constitute stiff flat hollow disks, both being composed of titanium alloy. The expansion webs 230 are composed of aluminum alloy.

In the configuration shown, the flanges 210 and 220 is composed similarly as the bench 110. The OAP mirror 170 attaches to the proximal flange 210, while the distal flange 220 mounts to the bench 110. As equipment temperature rises during operation of the laser 120, the bench 110 elongates, increasing the distance between mount 190 for the OAP mirror 170 and the counterpart opposing mirrors 160 and 180. The webs 230 thermally expand, increasing the separation between the flanges 210 and 220. This controllably and passively restores the original calibrated focal distance for the OAP mirror 170 by shifting the proximal flange 210 opposite the distal flange 220 that translates with expansion of the bench 110.

Figure 3:
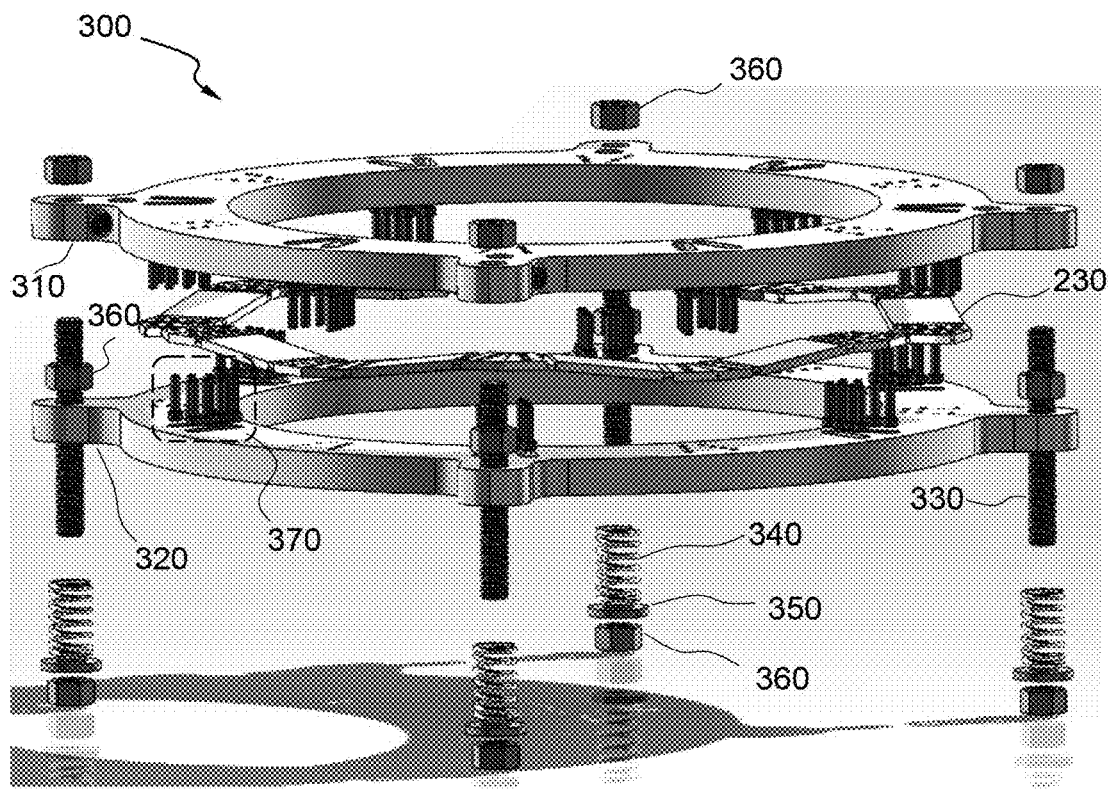
FIG. 3 is perspective exploded view of components for the compact thermal expander.

FIG. 3 shows a perspective exploded view 300 of components for the exemplary mount 190. The proximal and distal flanges 210 and 220 each correspondingly include four protrusion ears 310 and 320 each extending radially outward from the corresponding rims. Each bolt assembly 240 includes a threaded rod 330, a helical spring 340, a washer 350 and threaded nuts 360 between the flanges 210 and 220 and at each end of the rod 330. Screws 370 secure expansion web 230 to the flanges 210 and 220.

The ears 310 and 320 provide locations for through-holes while minimizing mass of the flanges 210 and 220, which have outer diameters of 12" (excluding their ears 310 and 320). The bolt assemblies 240 as well as the ears 310 and 320 provide compressive loading to simulate conditions on the bench 110, but are otherwise optional.

Figure 4:
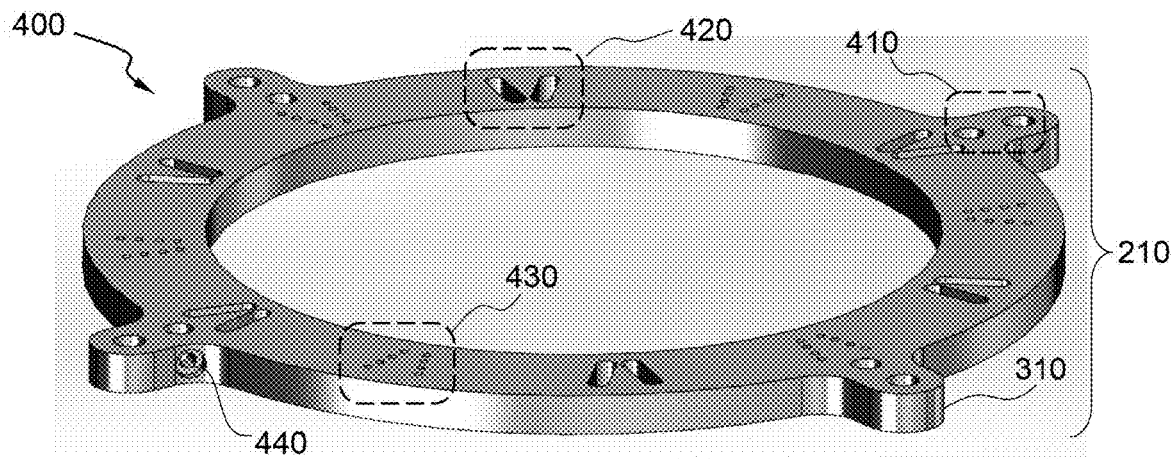
FIG. 4 is a perspective view of a proximal flange.

FIG. 4 shows a perspective view 400 of the proximal flange 210. The corresponding ears 310 include a pair of through-holes 410 with the radially outer hole receiving the rod 330. Six angularly distributed pairs of slots 420 that form inwardly facing wedges are uniformly disposed along the proximal flange 210. Between these slots 420 are six similarly disposed pairs of four-linearly-arranged hole patterns 430 arranged to form radially inwardly facing wedges along the proximal flange 210. The screw 440 inserts into a ¼"-20 threaded securing hole (quarter-inch diameter Ø) to tighten Starrett micrometer heads received by the inner holes in the pair 410.

Figure 5:
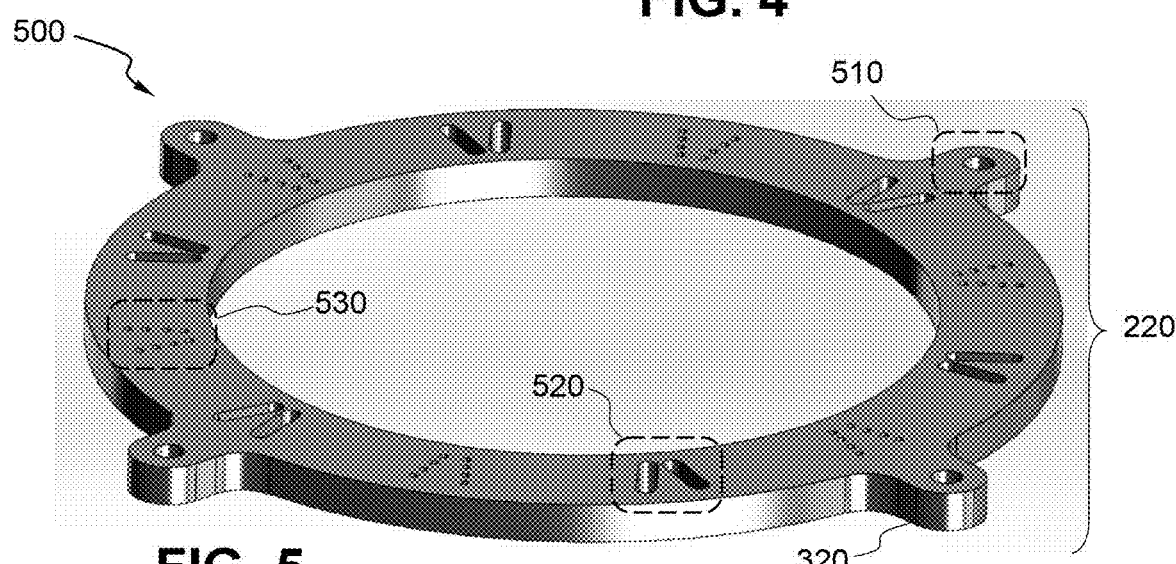
FIG. 5 is a perspective view of a distal flange.

FIG. 5 shows a perspective view 500 of the distal flange 220. The corresponding ears 320 include a pair of through-holes 510 with the radially outer hole receiving the rod 330. Six angularly distributed pairs of slots 520 that form inwardly facing wedges are uniformly disposed along the distal flange 220. Between these slots 520 are six similarly disposed pairs of four linearly-arranged hole patterns 530 arranged to form radially inwardly facing wedges along the distal flange 220.

Figure 6:
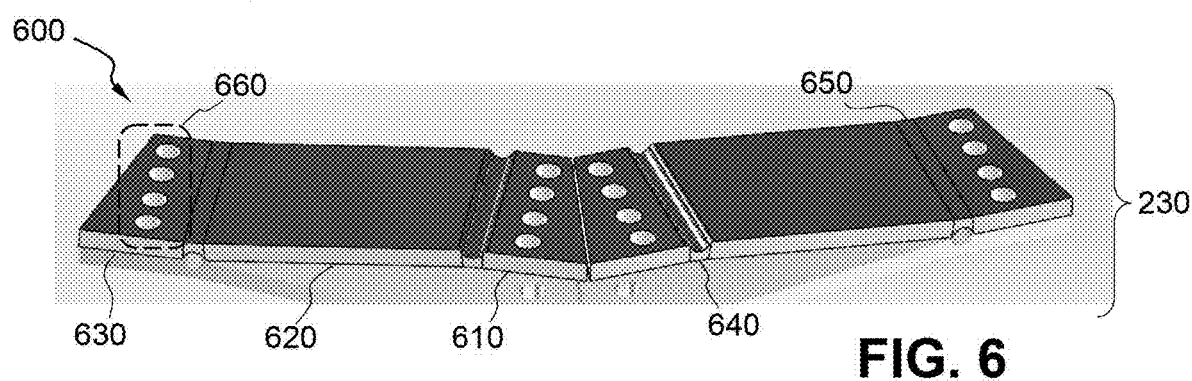
FIG. 6 is a perspective view of an expansion web.

FIG. 6 shows a perspective view 600 of the spacer set 230 for separating the flanges 210 and 220. Central hinged segments 610 connect to each other and to adjacent plates 620 along their inner edges. Outer hinged segments 630 connect to the plates 620 along the segments' outer edges. The segments 610 connect to the plates 620 by folding hinges 640. The segments 630 connect to the plates 620 by hinges 650. The segments 610 and 630 each include a set of linearly arranged 5-40 threaded holes 660 for securing to the hole patterns 430 and 530 by screws 370 that also pass through counterpart slots 520 and 420 to secure the flanges 210 and 220.

In response to laser energy received by the OAP mirror 170, the proximal flange 210 rises in temperature more than the distal flange 220 from ambient. Consequently, the proximal flange 210 experiences more radial expansion than the distal flange 220 during this operation. The web extensions 230 compensate for this distortion induced by thermal differences. The radially outer holes 410 and 510 on their respective ears 310 and 320 receive the rods 330 of the bolt assemblies 240, which provide compression load for prototype testing purposes. These outer holes 410 and 510 with their bolt assemblies 240 can be omitted for testing on the bench 110.

Figure 7:
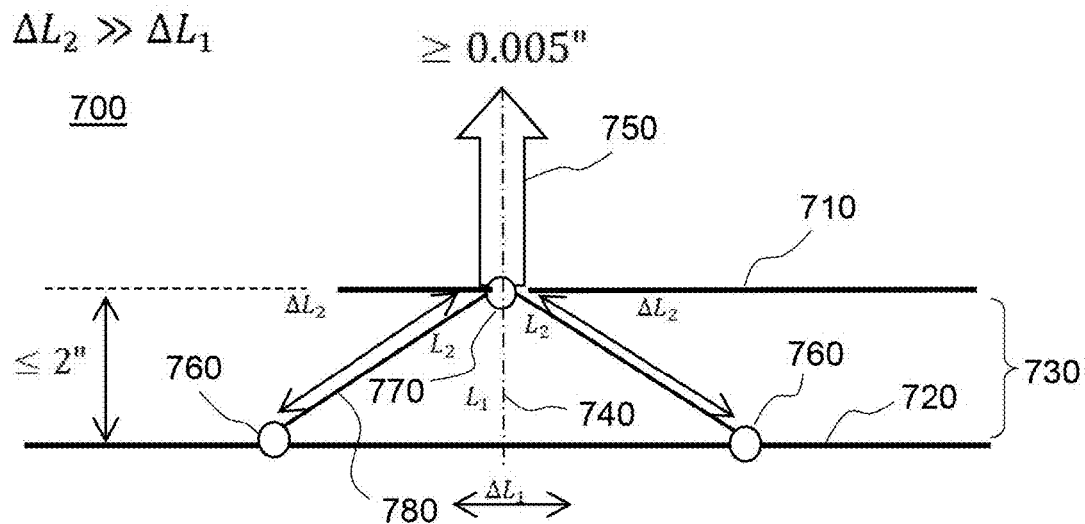
FIG. 7 is a schematic view of the exemplary expander's operation via thermal deflection.

FIG. 7 shows a force diagram view 700 upper interface surface 710 and a lower interface surface 720 by the expansion web 230 between a separation distance 730. These surfaces 710 and 720 denote the inner-facing planes of their respective ring flanges 210 and 220. End-nodes 760 and mid-node 770 form a triangle bounded by the surface 720, acting as pin joints. The normal offset along the centerline 740, through which a force 750 perpendicular to the surface 720 elevates mid-node 770 by less than 2" above the end-nodes 760. The first length $L_1$ denotes the distance in titanium between the end-nodes 760. The second length $L_2$ denotes the distance in aluminum between each end-node 760 to the mid-node 770. An arm 780 spans the distance between each end-node 760 and an adjacent mid-node 770. Linkage arms 780 denote the plates 620, nodes 760 denote segments 630, and nodes 770 denote segments 610, with the plates 620 and segments 610 and 630 connected by respective hinges 640 and 650.

Elongation distances relate to a product of the coefficient of thermal expansion (CTE) α, the initial length and the temperature difference ΔT. For example, expansion along the surface 720 between the end-nodes 730 can be expressed for first and second materials as: $\Delta L_1 = \alpha_1 L_1 \Delta T$, while expansion along the distance between each end-node 760 and the mid-node 770 can be expressed as: $\Delta L_2 = \alpha_2 L_2 \Delta T$. The differences in expansion coefficients causes the second expansion to greatly exceed the first, as $\Delta L_2 \gg \Delta L_1$.

The nodes 760 are separated by lateral deflection $\Delta L_1$ and normal deflection $\Delta L_2$ along the centreline 740, the latter resulting in normal displacement 750 away from the surface 720. One option for thermal deflection mitigation is linearly counteracting the deflection of the titanium bench 110 by applying aluminum (Al) counteraction plates 620. Because aluminum has a multi-factor—in this example three times—the CTE of titanium (Ti), the optical focus distance remains unchanged through temperature variation from operation of the laser 120.

The first material, such as for the surface 720, can be grade-5 titanium with CTE $\alpha_1$ of 8.5E-6/° C. as applicable to the bench 110 and flanges 210 and 220. The second material can be aluminum alloy Al6061-T6 with CTE $\alpha_2$ of 2.2E-5/° C. as applicable to the expansion webs 230. The expansion coefficients for aluminum is about three times that of titanium. The shorter canted plates 620 in the expansion webs 230 restrain and compensate for the radial response of the bench 110 to changes in material temperature.

Figure 8:
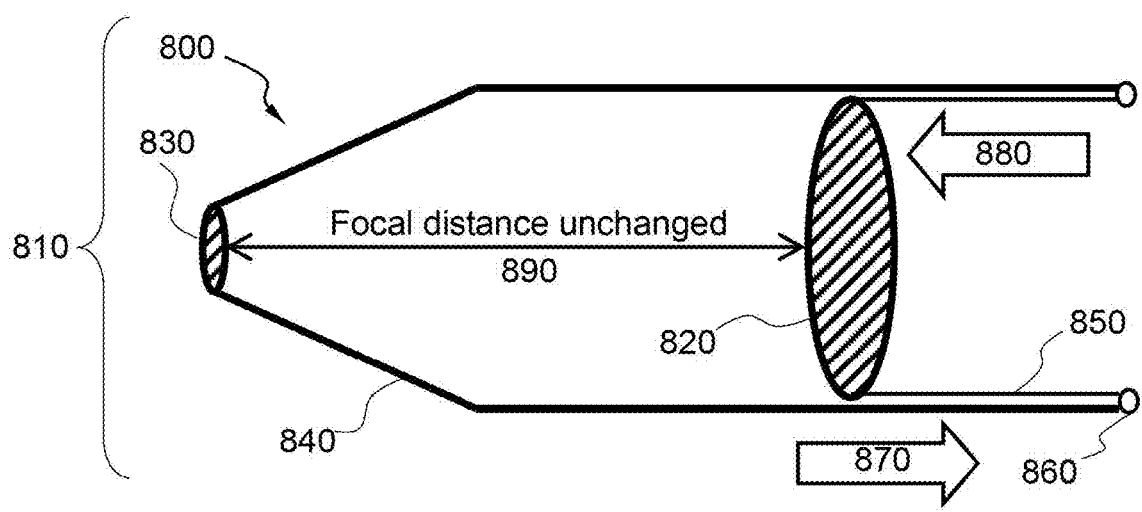
FIG. 8 is a schematic view of analogous deflection compensation from annular sleeves compensating for lengths between lenses.

FIG. 8 shows an analogous representational diagram view 800 of focal distance on a lens mount 810 in relation to thermal expansion between a focal lens 820 and a viewing lens 830 within a titanium outer housing 840 and an aluminum inner sleeve 850 connected by an annulus 860. Thermal expansion of the titanium housing 840 causes thermal elongation 870, which is compensated by similar thermal elongation 880 by the aluminium sleeve 850, thereby leaving the focal distance 890 between the lenses 810 and 820 unaltered. The principle of thermal expansion compensation is the same for diagram view 700 explaining an embodiment of the exemplary mount 190, but accomplishing this feature within a much flatter geometry.

The diagram in view 800 provides a representational illustration of the exemplary design for thermal compensation. Such configuration is required in the absence of a compact thermal actuator to compensate for thermal deflection in a volumetrically limited arena.

FIG. 9 shows a tabular view 900 of distance results micrometer measurements for combinations of temperature and compression force: first 910 at 45° C., 18.32 $lb_f$; second 920 at 72° C., 0 $lb_f$; third 930 at 77° C., 18.32 $lb_f$; fourth at 940 4° C., 18.32 $lb_f$; fifth 950 at 4° C., 0 $lb_f$; sixth 960 at −22° C., 18.32 $lb_f$; seventh 970 at −20° C., 18.32 $lb_f$; eighth 980 at −28° C., 0 $lb_f$, and ninth 990 at −26° C., 18.32 $lb_f$. In all these examples, the micrometer measurements averages range at 0.306"±0.013".

These distanced measured are the actual stroke of the compact thermal compensator mount 190 (also called the Compact Thermal Expander) under the recorded thermal and compressive force conditions. The compressive force was added as a factor because under operational conditions the exemplary expander will have an attached load corresponding to the weight of the OAP mirror 170.

FIG. 10 shows a tabular view 1000 of relevant material properties for the exemplary mount 190. These items include mechanical parameter inputs 1010, parameter calculations 1020, calculations 1030, primary result 1040 and thermal conditions 1050. These results show the thermal expansion of the bench 110 at 1.6253" while the webs 230 counter this in the opposite direction for the OAP mirror 170 by 1.638", thereby maintaining focal distance across the operational temperature range.

Research and design for the Compact Thermal Expander provides a design solution for the thermal deflection challenge encountered by all precision optical systems. This includes (but is not limited to) the Laser Weapon System (LWS), telescopes, and optical mounts requiring precision and rigid athermalization. Thermal deflection may be caused by multiple thermal energy inputs including ambient temperature changes, electronic heat generation, lasing heat energy.

Conventional thermal deflection mitigation techniques are limited due to compensation inaccuracies as well as higher cost and necessity for additional hardware and interfaces resulting additional failure modes and overall increase in system mass. The exemplary Compact Thermal Expander as mount 190 constitutes a working prototype able to passively and automatically counteract component thermal expansion with high compensation accuracy and minimal hardware footprint.

Conventional thermal deflection mitigation techniques include: active controlling of LWS component temperatures and electronic focusing. The former involves forced thermal energy addition or subtraction that causes thermal gradients resulting in astigmatism and decreased LWS lethality, as well as additional thermal management and controls requires additional hardware resulting in additional weight and more failure modes.

The latter incorporates standard thermocouples with a reasonable response time typically have an accuracy range of 1° C. to 5° C. resulting in inaccurate thermal compensation, as well as requiring higher range focusing hardware to compensate for thermally induced motion. By contrast, the exemplary Compact Thermal Expander as mount 190 mitigates thermal deflection accurately because it serves as a passive thermal expansion driven linear actuator, and does not add significant mass or volumetric incursion.

A Compact Thermal Expander prototype was fabricated to ensure the concept of a bimetallic expansion device would perform as expected under operational conditions. The prototype was designed using aluminum expansion webs fastened to a titanium mount plate based on material CTE, but the concept is not limited to the use of aluminum and titanium for the bimetallic structure. Other materials can be applied depending on the programmatic requirements for stiffness, expansion amount, contraction amount, mass, etc.

Examples in the material nomenclature include "web material" and "mount plate material":

(1) steel expansion webs and tungsten mount plate (steel/tungsten) for increased expander stiffness with approximately the same thermal deflection as the aluminum/titanium bimetallic structure;

(2) aluminum/tungsten for increased expansion with increased heat;

(3) titanium/aluminum for contraction rather than expansion under increasing thermal load.

The prototype requirements were inspired by a thermal deflection issue experienced in telescope optical alignment with an expansion requirement of at least 0.005" to compensate for alignment bench deflection. Overall length is no greater than 2" to fit behind the optic in beam direction for the considered conditions.

Schematic view 700 illustrates a bimetallic triangle scheme to produce a thermal deflection linear actuator. Because the triangle (created by two aluminum links and one titanium link) is bilaterally symmetric over the expansion centerline, the system can be modelled as two right triangles. Because the base of the right triangle (titanium) expands much less than the hypotenuse of the right triangle (aluminum), the result from the opposing triangle expansion results in a significant deflection upwards with thermal expansion of all components. The triangle corners are designed with flexibility to reduce component stress when the Compact Thermal Expander undergoes deflection.

Tabular view 900 features a design calculator using the prior analysis. To aid design of the Compact Thermal Expander, an analytical calculator was developed to produce dynamic expansion results based on material property, geometry, and thermal inputs. The thermal deflection equation with bilaterally symmetric Pythagorean triangle calculations produces an analytical deflection result.

These geometry parameters drive the structural design to reduce design and analysis iterations, and improve the flexibility of producing an appropriate Compact Thermal Expander based on design requirements. Based off design calculator geometry parameters, bimetallic Ti6Al-4V and Al 6061-T6 expander assembly was designed.

To verify design, analysis was performed on the 3D model using ANSYS Mechanical with thermal soak conditions. Mesh applied: Plates: 0.075", Webs: 0.03", Fasteners: 0.02", Analysis over-predicted deflection showing a total of 0.0078" of thrust. Further analysis shows that solution is grid-dependent (due to mesh size and quality). Analysis with higher-quality grids predict deflection closer to the 0.00505" from the design calculator. Structural analysis predicts that applying a 10 $lb_f$ force in any direction causes deflection of <<0.0005".

Empirical testing was performed on the prototype hardware, which confirmed successful performance of the Compact Thermal Expander Prototype. One option for thermal deflection mitigation linearly counteracts the deflection of the titanium bench 110 by applying aluminum counteraction linkage arms 780. Because aluminum has three times the CTE of titanium, the optical focus distance would remain unchanged.

The exemplary Compact Thermal Expander can mitigate thermal expansion, reducing risk and cost over conventional mitigation techniques, can be used in LWS beam director applications to greatly enhance system lethality and robustness, provides capability that can greatly reduce overall design cost for LWSs, and can also be applied in any program or project requiring active and precise thermal compensation.

As seen in test result plots, the expansion data for all compressive cases has a linear expansion trend, fitted to data with linear second order relations to predict and compare expansion parameters based on empirical data. The trendline slope for all test cases (including analytical) is 0.0002 with inconsistent y-intercepts due to added compression and anomaly differences with the analytical data. The data spreads for high and low temperatures are due to thermal gradients from non-equilibrium conditions.

Analysis performed shows thermal gradients of approximately 4° C. based on thermal application time and convection film coefficients. Data are nonetheless sufficient to demonstrate success of the Compact Thermal Expander prototype performance. Compression testing at room temperature shows deflection of 0.001" with 18.32 lb$_f$ and 0.005" with 91.6 lb$_f$.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A compact modular mount for mechanically compensating for focal distance change on a table due to thermal expansion, said mount comprising:
    first and second flat rings composed of a first material, disposed axially in tandem, each ring including a first plurality of angularly distributed outer holes, a second plurality of angularly distributed radially oriented slot patterns and a corresponding third plurality of radially separated linear hole patterns, wherein said second and third pluralities align to alternate on respective said first and second rings;
    a plurality of spacers including a fourth plurality of symmetrically arranged plates hinging to adjacent segments for separating said rings, said segments being composed of a second material, each plate including a fifth plurality of linearly distributed holes that align with said third plurality of linear hole patterns on respective said first and second rings;
    a sixth plurality of threaded fasteners, each fastener inserting through a slot of said second plurality, a plate hole of said fifth plurality, and a ring hole of said third plurality; and
    a seventh plurality of bolts aligned through corresponding said first plurality of outer holes to maintain angular alignment of said rings, wherein said second material has a multi-factor higher coefficient of thermal expansion than said first material.

2. The mount according to claim 1, wherein said rings and the table are composed of titanium.

3. The mount according to claim 2, wherein said spacers are composed of aluminum.

4. The mount according to claim 2, wherein said spacers are composed of steel.

5. The mount according to claim 1, wherein each bolt of said plurality of bolts further includes a helical spring.

6. The mount according to claim 1, wherein said first material is titanium and said second material is aluminum.

7. The mount according to claim 1, wherein said first material is titanium and said second material is steel.

8. The mount according to claim 1, wherein said second and third pluralities for said ring slot and hole patterns match, and said fourth plurality for said plate hole patterns is double in number to said third plurality, such that said second and third pluralities equal six on said each ring and said fourth plurality equals twelve.

9. The mount according to claim 8, wherein said sixth plurality of said fasteners is double in number to said fourth times fifth pluralities of said plate holes, such that said sixth plurality equals ninety-six.

10. The mount according to claim 1, wherein said first and seventh pluralities of respective said outer holes and said bolts are identical equaling four.

11. A compact modular mount for mechanically compensating for focal distance change on a table due to thermal expansion, said mount comprising:
    first and second flat rings composed of a first material, disposed axially in tandem, each ring including a first plurality of angularly distributed outer holes, a second plurality of angularly distributed radially oriented slot patterns and a corresponding third plurality of radially separated linear hole patterns, wherein said second and third pluralities align to alternate on respective said first and second rings;
    a plurality of spacers including a fourth plurality of symmetrically arranged plates hinging to adjacent segments for separating said rings, said segments being composed of a second material, each plate including a fifth plurality of linearly distributed holes that align with said-second third plurality of linear hole patterns on respective said first and second rings;
    a sixth plurality of threaded fasteners, each fastener inserting through a slot of said second plurality, a plate hole of said fifth plurality, and a ring hole of said third plurality; and
    a seventh plurality of bolts aligned through corresponding said first plurality of outer holes to maintain angular alignment of said rings, wherein said first material has a multi-factor higher coefficient of thermal expansion than said second material.

12. The mount according to claim 11, wherein said rings and the table are composed of aluminum and said spacers are composed of titanium.

13. The mount according to claim 11, wherein each bolt of said plurality of bolts further includes a helical spring.

14. The mount according to claim 11, wherein said first material is aluminum and said second material is titanium.

15. The mount according to claim 11, wherein said first material is steel and said second material is titanium.

16. The mount according to claim 11, wherein said second and third pluralities match for said ring slot and hole patterns, and said fourth plurality for said plate hole patterns is double in number to said third plurality, such that said second and third pluralities equal six on said each ring and said fourth plurality equals twelve.

17. The mount according to claim 16, wherein said sixth plurality of said fasteners is double in number to said fourth times fifth pluralities of said plate holes, such that said sixth plurality equals ninety-six.

18. The mount according to claim 11, wherein said first and seventh pluralities of respective said outer holes and said bolts are identical equaling four.

* * * * *